United States Patent
Kawasaki et al.

(10) Patent No.: US 12,435,215 B2
(45) Date of Patent: Oct. 7, 2025

(54) FLAME-RESISTANT RESIN COMPOSITION, METHOD FOR MANUFACTURING SAME, AND HYDROGENATED PETROLEUM RESIN

(71) Applicant: ENEOS Materials Corporation, Tokyo (JP)

(72) Inventors: Hiroshi Kawasaki, Tokyo (JP); Shotaro Uchizawa, Tokyo (JP); Ichigen Watanabe, Kanagawa (JP)

(73) Assignee: ENEOS MATERIALS CORPORATION, Tokyo (JP)

( * ) Notice: Subject to any disclaimer, the term of this patent is extended or adjusted under 35 U.S.C. 154(b) by 851 days.

(21) Appl. No.: 17/601,553

(22) PCT Filed: Apr. 8, 2020

(86) PCT No.: PCT/JP2020/015884
§ 371 (c)(1),
(2) Date: Oct. 5, 2021

(87) PCT Pub. No.: WO2020/209311
PCT Pub. Date: Oct. 15, 2020

(65) Prior Publication Data
US 2022/0195175 A1  Jun. 23, 2022

(30) Foreign Application Priority Data

Apr. 10, 2019 (JP) .................................. 2019-074679

(51) Int. Cl.
C08L 57/02 (2006.01)
C08K 3/22 (2006.01)

(52) U.S. Cl.
CPC ...... *C08L 57/02* (2013.01); *C08K 2003/2206* (2013.01); *C08K 2003/2217* (2013.01); *C08K 2003/2227* (2013.01)

(58) Field of Classification Search
None
See application file for complete search history.

(56) References Cited

U.S. PATENT DOCUMENTS

| | | | | |
|---|---|---|---|---|
| 3,926,878 A | * | 12/1975 | Shimizu | C09J 123/08 525/227 |
| 2006/0063892 A1 | * | 3/2006 | Yamane | C08F 8/04 526/346 |
| 2018/0134931 A1 | * | 5/2018 | Sasaki | C08L 53/02 |

FOREIGN PATENT DOCUMENTS

| | | | |
|---|---|---|---|
| CN | 1479755 A | 3/2004 | |
| CN | 1720272 A | 1/2006 | |
| CN | 102718924 A | 10/2012 | |
| CN | 104531007 A * | 4/2015 | |
| CN | 105969252 A * | 9/2016 | ............ G02B 6/443 |
| CN | 107778389 A | 3/2018 | |
| EP | 0 776 955 A1 | 6/1997 | |
| JP | 62007776 A * | 1/1987 | |
| JP | 0559241 * | 3/1993 | |
| JP | 2000-302887 | 10/2000 | |
| JP | 2002-003658 A | 1/2002 | |
| JP | 2002-047381 | 2/2002 | |
| JP | 2002-317097 | 10/2002 | |
| JP | 2003-220675 A | 8/2003 | |
| JP | 2010180325 A * | 8/2010 | |
| JP | 2012-188509 | 10/2012 | |
| JP | 2013-249388 | 12/2013 | |
| JP | 2016-138222 A | 8/2016 | |
| JP | 2016-155931 | 9/2016 | |
| JP | 2020-055983 | 4/2020 | |
| KR | 20180069585 | 6/2018 | |
| WO | 2004/052955 A1 | 6/2004 | |
| WO | 2018/062390 | 4/2018 | |

OTHER PUBLICATIONS

Zhou Kai, "Study on Hydrogenating of $C_5/C_9$ Copolymerized Petroleum Resin", Guangdong Chemical Industry, vol. 39, No. 241, Oct. 24, 2024, pp. 57-p. 58, English Abstract.
De-lin Wang et al., "Preparation and Application of Polyolefin Packaging Hot Melt Adhesive", Chinese Journal of Colloid & Polymer, vol. 37, No. 4, Dec. 15, 2019, partial translation.
ISR issued in WIPO Patent Application No. PCT/JP2020/015884, Jul. 7, 2020, English translation.
IPRP issued in WIPO Patent Application No. PCT/JP2020/015884, Oct. 21, 2021, English translation.
EESR issued in EP Patent Application No. 20787322.5, Nov. 28, 2022.
Office Action issued in JP Patent Application No. 2021-513685, Sep. 12, 2023, translation.

* cited by examiner

*Primary Examiner* — Tanisha Diggs
(74) *Attorney, Agent, or Firm* — GREENBLUM & BERNSTEIN, P.L.C.

(57) ABSTRACT

A flame retardant resin composition comprising: a hydrogenated petroleum resin, being a hydrogenated product of a polymer of an unsaturated hydrocarbon comprising at least one selected from the group consisting of an alicyclic compound having a five-membered ring and an aromatic hydrocarbon compound; a polyolefin; and an inorganic filler.

4 Claims, No Drawings

FLAME-RESISTANT RESIN COMPOSITION, METHOD FOR MANUFACTURING SAME, AND HYDROGENATED PETROLEUM RESIN

TECHNICAL FIELD

The present invention relates to a flame retardant resin composition, a method for manufacturing the same, and a hydrogenated petroleum resin.

BACKGROUND ART

Conventionally, flame retardant resins are widely used for members requiring flame retardancy, such as electric wires (communication cables, wiring in an appliance, power cords, optical fiber cords, etc.), electric facilities (lightning protection clamp covers, underground buried pipes, etc.), motor vehicles (inner layer sheets, wire protection tubes, etc.), building materials/construction materials (curing sheets, duct hoses, wire protection tubes, stadium seats, etc.) and home electric appliances (for housing, etc.). In Patent Literature 1, for example, a flame retardant resin composition comprising a base resin containing a specific resin, calcium carbonate particles, a silicone compound, and a fatty acid-containing compound is disclosed as a flame retardant resin composition used for an insulating layer and a sheath (an exterior) which compose a cable.

CITATION LIST

Patent Literature

Patent Literature 1: Japanese Unexamined Patent Publication No. 2016-155931

SUMMARY OF INVENTION

Technical Problem

When a flame retardant resin composition is used as a material for a cable jacket (an insulator for covering around a conductor such as an electric wire; a sheath (an exterior); etc.), it is preferable that it maintain strength (tensile strength) against stress and it have satisfactory strength against strain. As a flame retardant resin composition having such characteristics, conventionally, a polyvinyl chloride (PVC) resin has been widely used; however, PVC produces toxic gases during burning, which has been a problem.

Thus, an object of the present invention is to provide a flame retardant resin composition which can achieve satisfactory strength against strain while maintaining strength against stress. Further, other objects of the present invention are to provide a method for manufacturing the above flame retardant resin composition, and to provide a hydrogenated petroleum resin used for the flame retardant resin composition.

Solution to Problem

The present inventors succeeded in solving the above problem with a flame retardant resin composition having a specific composition. That is, the present invention provides a flame retardant resin composition comprising: a hydrogenated petroleum resin, being a hydrogenated product of a polymer of an unsaturated hydrocarbon comprising at least one selected from the group consisting of an alicyclic compound having a five-membered ring and an aromatic hydrocarbon compound; a polyolefin; and an inorganic filler.

The alicyclic compound may comprise a DCPD compound having a dicyclopentadiene skeleton.

The aromatic hydrocarbon compound may comprise at least one selected from the group consisting of an indene-based compound having an indene skeleton and a styrene-based compound having a styrene skeleton.

The polyolefin may comprise at least one selected from the group consisting of an ethylene/vinyl acetate copolymer, an ethylene/ethyl acrylate copolymer, polyethylene, and polypropylene.

The present invention also provides a method for manufacturing a flame retardant resin composition, comprising: a step of bringing a hydrogenated petroleum resin, being a hydrogenated product of a polymer of an unsaturated hydrocarbon comprising at least one selected from the group consisting of an alicyclic compound having a five-membered ring and an aromatic hydrocarbon compound, into contact with a polyolefin and an inorganic filler.

The present invention further provides a hydrogenated petroleum resin for a flame retardant resin composition, wherein the hydrogenated petroleum resin is a hydrogenated product of a polymer of an unsaturated hydrocarbon comprising at least one selected from the group consisting of an alicyclic compound having a five-membered ring and an aromatic hydrocarbon compound.

Advantageous Effects of Invention

According to the present invention, a flame retardant resin composition which can achieve the satisfactory strength against strain while maintaining the strength against stress is provided. Also, according to the present invention, a method for manufacturing the above flame retardant resin composition, and a hydrogenated petroleum resin used for the flame retardant resin composition are provided. Further, the above flame retardant resin composition can be a substitute of the PVC.

DESCRIPTION OF EMBODIMENTS

Hereinafter, embodiments of the present invention will be explained in detail.

The flame retardant resin composition according to the present embodiments comprises: a hydrogenated petroleum resin which is a hydrogenated product of a polymer of an unsaturated hydrocarbon; a polyolefin; and an inorganic filler.

The hydrogenated petroleum resin is a hydrogenated product of a polymer of an unsaturated hydrocarbon (hereinafter also referred to as a "petroleum resin"), and the unsaturated hydrocarbon is a compound having a carbon-carbon double bond, which is a polymerizable group, and capable of polymerizing each other.

The unsaturated hydrocarbon comprises at least one selected from the group consisting of an alicyclic compound having a five-membered ring and an aromatic hydrocarbon compound.

The unsaturated hydrocarbon may be contained in fractions collected from petroleum-derived raw material oil through thermal decomposition, etc., and may be mainly contained in petroleum-derived C5 and C9 fractions.

In the present embodiments, the above alicyclic compound is a compound having a five-membered ring but not having an aromatic ring. The above alicyclic compound includes a DCPD compound having a dicyclopentadiene skeleton, a CPD compound (a C5 compound) having a cyclopentadiene skeleton, etc. Here, the dicyclopentadiene skeleton indicates a carbon skeleton in the dicyclopentadiene. The cyclopentadiene skeleton indicates a carbon skeleton in the cyclopentadiene.

It is preferable that the unsaturated hydrocarbon contain the DCPD compound as the above alicyclic compound. Examples of the DCPD compound include dicyclopentadiene and methyldicyclopentadiene.

Examples of the CPD compound include cyclopentadiene and a methylcyclopentadiene.

The proportion of the DCPD compound in the above alicyclic compound may be 50% by mass or more, preferably 60% by mass or more, more preferably 70% by mass or more, and 100% by mass.

The content of the above alicyclic compound in the unsaturated hydrocarbon may be 30% by mass or more, preferably 35% by mass or more, and more preferably 40% by mass or more, based on the total amount of the unsaturated hydrocarbon. Then, a polymerization reaction tends to proceed easily, and a polymer of interest tends to be easily obtained. Also, the content of the above alicyclic compound in the unsaturated hydrocarbon may be 85% by mass or less, preferably 80% by mass or less, and more preferably 70% by mass or less, based on the total amount of the unsaturated hydrocarbon. Then, the hydrogenated petroleum resin having high compatibility with a resin fraction tends to be easily obtained.

The aromatic hydrocarbon compound may be the C9 compound mainly contained in the petroleum-derived C9 fraction, and specifically includes an indene-based compound having an indene ($C_9H_8$) skeleton, a styrene-based compound having a styrene skeleton, etc. Examples of the indene-based compound include indene and methylindene. Examples of the styrene-based compound include styrene and methylstyrene.

The content of the above aromatic hydrocarbon compound in the unsaturated hydrocarbon may be 10% by mass or more, 20% by mass or more, or 30% by mass or more, based on the total amount of the unsaturated hydrocarbon. The content of the aromatic hydrocarbon compound may be 60% by mass or less, 50% by mass or less, or 40% by mass or less, based on the total amount of the unsaturated hydrocarbon.

When the unsaturated hydrocarbon further includes the alicyclic compound and the aromatic hydrocarbon compound, the ratio of the content $C_1$ of the aromatic hydrocarbon compound to the content $C_2$ of the alicyclic compound, $C_1/C_2$ (mass ratio), is preferably 0.25 or more, and more preferably 0.43 or more. Then, the hydrogenated petroleum resin having high compatibility with the resin fraction tends to be easily obtained. Also, the ratio $C_1/C_2$ is preferably 1.38 or less, and more preferably 1.27 or less. Then, the polymerization reaction tends to proceed easily, and the polymer of interest tends to be easily obtained.

In addition to the above alicyclic compound and the aromatic hydrocarbon compound, an aliphatic compound not having a ring structure, an alicyclic compound not having a five-membered ring, a heterocyclic compound having a heterocyclic ring, etc. may be included as the unsaturated hydrocarbon. Examples of the above aliphatic compound include piperylene and isoprene. Examples of the above heterocyclic compound include coumarone. The content of the unsaturated hydrocarbons may be 5% by mass or less, 1% by mass or less, or 0% by mass, based on the total amount of the unsaturated hydrocarbons.

The petroleum resin can be called a polymer having a compound-derived structural unit of at least one selected from the group consisting of the above alicyclic compound and the above aromatic hydrocarbon compound. The content of the above structural unit in the petroleum resin corresponds to the content of the above alicyclic compound and/or the above aromatic hydrocarbon compound in the unsaturated hydrocarbon.

The petroleum resin can be obtained by polymerizing the unsaturated hydrocarbon. A method for polymerizing the unsaturated hydrocarbon is not particularly limited, and can be appropriately selected from known polymerization methods.

In a preferred aspect, the petroleum resin may be obtained by a thermal polymerization of the unsaturated hydrocarbon. A method for the thermal polymerization is not particularly limited, and may be conducted by heating a raw material composition containing the unsaturated hydrocarbon to a predetermined reaction temperature.

The reaction temperature of the thermal polymerization is not particularly limited, and may be 250° C. or more, preferably 260° C. or more, and more preferably 270° C. or more. Further, the reaction temperature of the thermal polymerization may be 300° C. or less, preferably 290° C. or less, and more preferably 280° C. or less.

The reaction time of the thermal polymerization (time of maintaining a reaction system at the above reaction temperature) is not particularly limited, and may be 30 to 180 minutes, and preferably 60 to 120 minutes.

The raw material composition used for the thermal polymerization may further contain ingredients other than the unsaturated hydrocarbon. For example, the petroleum-derived fractions (the C5 fraction, the C9 fraction, etc.) may not have a polymerizable group, and may further contain non-polymerizable hydrocarbons which are not involved in the thermal polymerization. The raw material composition used for the thermal polymerization may further contain such non-polymerizable hydrocarbons. Examples of the non-polymerizable hydrocarbons include saturated hydrocarbons (alkanes, cycloalkanes, etc.) and aromatic hydrocarbons (benzene, toluene, etc.).

When the raw material compound contains ingredients other than the unsaturated hydrocarbon, these ingredients can be removed by conducting, e.g., removal of light fractions (distillation) after the thermal polymerization of the unsaturated hydrocarbon.

The hydrogenated petroleum resin is the hydrogenated product of the petroleum resin. The hydrogenated petroleum resin may be a partially hydrogenated product or a fully hydrogenated product of the petroleum resin, and it is preferable that it be a partially hydrogenated product. That is, the hydrogenated petroleum resin may be one in which a part or all of the reducing sites of the unsaturated bonds, etc. contained in the petroleum resin are hydrogenated.

The softening point of the hydrogenated petroleum resin is not particularly limited, and may be 80° C. or more, 90° C. or more, or 100° C. or more. When the softening point of the hydrogenated petroleum resin is within the above range, strength characteristics of the flame retardant resin can be further improved. Further, an upper limit of the softening point of the hydrogenated petroleum resin is also not particularly limited, and may be 150° C. or less, 130° or less, or 120° C. or less. When the softening point of the hydrogenated petroleum resin is within the above numerical range, processability tends to be improved. In the present description, in this context, the softening point of the hydrogenated petroleum resin means a value measured by using DP70 manufactured by Mettler-Toledo International, Inc., and by a method in accordance with ASTM D6090.

The weight average molecular weight of the hydrogenated petroleum resin is not particularly limited, and may be 4000 or less, 2000 or less, or 1000 or less. Further, a lower limit of the weight average molecular weight of the hydrogenated petroleum resin is also not particularly limited, and may be 300 or more, or 350 or more. In the present description, in this context, the weight average molecular weight of the hydrogenated petroleum resin means a value in terms of standard polystyrene measured by a GPC (Gel Permeation Chromatography).

The hydrogenated petroleum resin can be obtained by hydrogenating the polymer of the unsaturated hydrocarbon (the petroleum resin). A method for hydrogenating the petroleum resin to obtain the hydrogenated product is not particularly limited, and a known method can be used for. For example, the hydrogenating is conducted by allowing the petroleum resin to flow to a reactor filled with a hydrogenation catalyst, and by bringing the hydrogenation catalyst into contact with the petroleum resin in the presence of hydrogen. Such hydrogenation of the petroleum resin may be conducted in a solvent or without a solvent.

The hydrogenation catalyst is not particularly limited, and may be a nickel-based catalyst, a palladium-based catalyst, a platinum-based catalyst, etc.

Conditions of the hydrogenating reaction can be appropriately changed according to a type of the petroleum resin and desired physical properties of the hydrogenated petroleum resin. A hydrogen pressure in the hydrogenation reaction may be 5 MPa or more, or 10 MPa or more. Further, the hydrogen pressure in the hydrogenation reaction may be 30 MPa or less, or 20 MPa or less. A reaction temperature in the hydrogenation reaction may be 200° C. or more, or 230° C. or more. Further, the reaction temperature in the hydrogenation reaction may be 310° C. or less, or 300° C. or less.

A content of the hydrogenated petroleum resin may be 1% by mass or more, 2% by mass or more, or 5% by mass or more, based on the total amount of the flame retardant resin composition. Further, the content of the hydrogenated petroleum resin may be 25% by mass or less, 20% by mass or less, or 15% by mass or less, based on the total amount of the flame retardant resin composition.

The flame retardant resin composition according to the present embodiment comprises a polyolefin as a resin. The polyolefin is not particularly limited, and it is preferable that it be, for example, a thermoplastic resin. Examples of the polyolefin include an ethylene/vinyl acetate copolymer (EVA), an ethylene-ethyl acrylate copolymer (EEA), polyethylene, and polypropylene, and among them it is preferable that the polyolefin be at least one selected from the group consisting of EVA and EEA.

In case of using the EVA as the polyolefin, EVA in which a content of vinyl acetate may be 30 to 50% by mass may be used.

The content of the polyolefin may be 5% by mass or more, 8% by mass or more, or 10% by mass or more, based on the total amount of the flame retardant resin composition. Further, the content of the polyolefin may be 35% by mass or less, 30% by mass or less, or 25% by mass or less, based on the total amount of the flame retardant resin composition.

The inorganic filler used in the flame retardant resin composition according to the present embodiment is not particularly limited, and examples thereof include aluminum hydroxide, magnesium hydroxide, and calcium hydroxide. These inorganic fillers can be used singly or in combinations of two or more thereof. Further, the shape of the inorganic filler is also not particularly limited, and may be any of powdery, flaky, fibrous, etc.

The flame retardant resin composition according to the present embodiment may include a further additive other than the above components, to the extent that the effects of the present invention are not significantly impaired. Further additive is not particularly limited as long as it is one generally added to the flame retardant resin composition, and examples thereof include an antioxidant, a lubricant, a processing stabilizer, a coloring agent, a foaming agent, and a reinforcing agent. The content of the further additive may be 5% by mass or less, or 1% by mass or less, based on the total amount of the flame retardant resin composition.

The flame retardant resin composition according to the present embodiment can be manufactured by undergoing a step of mixing the above hydrogenated petroleum resin, the polyolefin, the inorganic filler, and a further additive if necessary. The above step may be a step of adding the above hydrogenated petroleum resin to the mixture containing the polyolefin, the inorganic filler, and a further additive if necessary. That is, the above hydrogenated petroleum resin can also be called a hydrogenated petroleum resin for the flame retardant resin composition added to the flame retardant resin.

The density of the flame retardant resin composition is not particularly limited, and may be 1.0 g/cm$^3$ or more, 1.2 g/cm$^3$ or more, or 1.4 g/cm$^3$ or more, and 2.0 g/cm$^3$ or less, 1.8 g/cm$^3$ or less, or 1.6 g/cm$^3$ or less. In the present description, in this context, the density is a value measured at a temperature of 23° C. in accordance with Method A of JIS K7112 (Immersion method).

The flame retardant resin composition according to the present embodiment not only can achieve an excellent strain at break, but also has excellent processability when processing a molded product. As an evaluation index of the processability, a melt mass flow rate (MFR (21.6 kg)) of the flame retardant resin composition at a load of 21.6 kg is, for example, 50 g/10 min or more, 60 g/10 min or more, or 70 g/10 min or more. Further, an upper limit of the MFR (21.6 kg) is, for example, 200 g/10 min or less, 180 g/10 min or less, or 160 g/10 min or less. The melt mass flow rate (MFR (2.16 kg)) of the flame retardant resin composition at a load of 2.16 kg is, for example, 0.01 g/10 min or more, 0.05 g/10 min or more, or 0.1 g/10 min or more. Further, an upper limit of the MFR (2.16 kg) is, for example, 1 g/10 min or less, 0.95 g/10 min or less, or 0.9 g/10 min or less. In the present description, in this context, the MFR is a value measured under the conditions of a temperature of 190° C. and a load of 2.16 kg or 21.6 kg in accordance with Method A of JIS K7210-1 (a mass measurement method).

By melting and kneading the flame retardant resin composition obtained as described above in a general-purpose kneading machine such as extruding machine, etc., the flame retardant resin molded product having a desired shape can be manufactured. The flame retardant resin molded product can be used by processing to a variety of shapes such as a sheet, a tape, a rod, etc. depending on an application. For example, when it is used for a cable jacket for covering around conductors such as electric wires, it can be obtained by processing the flame retardant resin composition using a wire coating extrusion, a tube extrusion, etc.

The flame retardant resin molded product obtained from the flame retardant resin composition according to the present embodiment can be suitable used, particularly, for the cable jacket as described above because it has good strength against strain. The strength against strain can be evaluated by measuring a value of a strain at break. Further, the above flame retardant resin molded product can possess other strength characteristics such as a yield stress and a stress at break required for the cable jacket, while possessing flame retardancy usually required for the flame retardant resin.

EXAMPLES

Hereinafter, the present invention will be described more specifically with reference to Examples; however, the present invention is not limited to the Examples.
[Manufacturing of Petroleum Resin]

Example 1

<Synthesis of Polymer of Unsaturated Hydrocarbon>

Each component shown in Table 1 was mixed at the mass ratio shown in Table 1 to obtain a mixed solution. Next, the obtained mixed solution was charged into a thermal polymerization apparatus (manufactured by Toyo Koatsu Co. Ltd.). Next, a temperature of the mixed solution was raised to 276° C. under the condition of a heating rate of 5° C./min and maintained for 120 minutes. Afterward, cooling water was allowed to flow, and the mixed solution was rapidly cooled to obtain a thermally polymerized resin solution. For the obtained thermally polymerized resin solution, removal of light fractions (distillation) was conducted to remove unreacted substances and components having low degree of polymerization, to obtain a polymer.
<Hydrogenation of Polymer of Unsaturated Hydrocarbon>

The obtained polymer of the unsaturated hydrocarbon was dissolved in kerosene to adjust to a concentration of 30% by mass. The obtained solution was charged into a hydrogenating reactor filled with a nickel-based catalyst and hydrogen was allowed to flow at the same time; and hydrogenation of the polymer of the unsaturated hydrocarbon was conducted under the conditions of a pressure of 18 MPa and a temperature of 280° C. for 1 hour to obtain a solution containing a hydrogenated product of the polymer of the unsaturated hydrocarbon. For the obtained solution containing the hydrogenated product of the polymer of an unsaturated hydrocarbon, the removal of light fractions (distillation) was conducted to remove kerosene in the solution, to obtain a hydrogenated petroleum resin (a petroleum resin A).

Example 2

A hydrogenated petroleum resin (a petroleum resin B) was obtained in the same method in Example 1 except that the components of the mixed solution was changed to the composition shown in Table 1 and that the maximum temperature at the polymerization was set to 268° C.

Example 3

A hydrogenated petroleum resin (a petroleum resin C) was obtained in the same method in Example 1 except that the components of the mixed solution was changed to the composition shown in Table 1 and that the maximum temperature at the polymerization was set to 268° C.

Comparative Example 1

A solution having the composition shown in Table 1 was prepared, and the solution and the Lewis acid catalyst were charged into a polymerization apparatus in which a temperature was set to 30° C., to obtain a catalyst polymerized resin solution. For the obtained catalyst polymerized resin solution, the removal of light fractions (distillation) was conducted to remove unreacted substances and components having low degree of polymerization, to obtain a polymer of an unsaturated hydrocarbon (a petroleum resin D).

Comparative Example 2

A solution having the composition shown in Table 1 was prepared, and the solution and the Lewis acid catalyst were charged into a polymerization apparatus in which a temperature was set to 30° C., to obtain a catalyst polymerized resin solution. For the obtained catalyst polymerized resin solution, the removal of light fractions (distillation) was conducted to remove unreacted substances and components having low degree of polymerization, to obtain a polymer of an unsaturated hydrocarbon (a petroleum resin E).
[Measurement of Resin Softening Point of Petroleum Resin]

Softening point of each sample of the above obtained petroleum resins A to E was measured by a method in accordance with ASTM D6090, using DP70 manufactured by Mettler-Toledo International, Inc. Results are shown in Table 1.

TABLE 1

|  |  | Example 1 Petroleum Resin A | Example 2 Petroleum Resin B | Example 3 Petroleum Resin C | Comparative Example 1 Petroleum Resin D | Comparative Example 2 Petroleum Resin E |
|---|---|---|---|---|---|---|
| Unsaturated Hydrocarbon (% by mass) | DCPD COMPOUND (% by mass) | 42 | 68 | 75 | — | — |
|  | C9 COMPOUND (% by mass) | 23 | 7 | — | — | 65 |
|  | C5 COMPOUND (% by mass) | — | — | — | 50 | — |
| Non-Polymerizable Hydrocarbon (% by mass) |  | 35 | 25 | 25 | 50 | 35 |
| Softening Point (° C.) |  | 103 | 103 | 125 | 100 | 140 |

[Preparation of Flame Retardant Resin Composition]

The above obtained each petroleum resin A to E, an ethylene/vinyl acetate copolymer, an inorganic filler and an antioxidant were kneaded at a composition (unit: % by mass) shown in Table 2 below to obtain a flame retardant resin composition. The kneading was conducted by using a pressure kneader (manufactured by Toyo Seiki Seisaku-sho, Ltd.) and a mixing roll machine (manufactured by Kneader Machinery Co, Ltd.) for 15 minutes under the conditions of a starting temperature of 180° C. and a rotating speed of 50 rpm. Further, details of ingredients in Table 2 are as follows.

Ethylene/vinyl acetate copolymer (EVA): NUC-3195, manufactured by NUC Corporation.

Inorganic filler: magnesium hydroxide, KISUMA 5A, manufactured by Kyowa Chemical Industry Co., Ltd.

Antioxidant: Irganox 1010, manufactured by BASF SE.

[Evaluation of Strain at Break]

Each flame retardant resin composition obtained in Examples 4 to 8 and Comparative Examples 3 and 4 was heat molded under the conditions of a heating temperature of 180° C. and a heating time of 10 minutes to prepare a flame retardant resin molded product. The obtained flame retardant resin molded product was punched into a dumbbell-shaped No. 3 with a thickness of 1 mm, a width of 5 mm, and a gauge length of 20 mm, to obtain a test specimen. Using the obtained specimen, a tensile test was conducted at a tensile speed of 200 mm/min with reference to JIS K6251, to measure a strain at break (an elongation percentage of the resin until it breaks). The results are shown in Table 2. In Table 2, it is shown that the larger the strain at break is, the larger the elongation percentage up to the break is.

<Processability (Melt Flow Rate: MFR)>

For each flame retardant resin composition obtained in Examples 4 to 8, the MFR was measured under the conditions of a temperature of 190° C. and a load of 2.16 kg or 21.6 kg in accordance with Method A of JIS K7210-1 (a mass measurement method). The measurement results are shown in Table 3. In any Example, shown was the MFR value of the extent that there was no practical problem in the processability. Further, in Table 3, it is shown that the larger the MFR value at each load is, the better the processability is.

<Flame Retardancy (Limiting Oxygen Index)>

Each flame retardant resin composition obtained in Examples 4 to 8 was heat molded under the conditions of a heating temperature of 180° C. and a heating time of 10 minutes to prepare a flame retardant resin molded product. The obtained flame retardant resin molded product was punched into Type IV specimen with a thickness of 3 mm, a width of 6.5 mm, and a length of 128 mm; and using the obtained test specimen, a limiting oxygen index was measured by Procedure C, Method B for ignition (propagating

TABLE 2

|  | Example 4 | Example 5 | Example 6 | Example 7 | Example 8 | Comparative Example 3 | Comparative Example 4 |
|---|---|---|---|---|---|---|---|
| Petroleum Resin A | 5 | 10 | 15 | — | — | — | — |
| Petroleum Resin B | — | — | — | 10 | — | — | — |
| Petroleum Resin C | — | — | — | — | 10 | — | — |
| Petroleum Resin D | — | — | — | — | — | 10 | — |
| Petroleum Resin E | — | — | — | — | — | — | 10 |
| EVA | 28.8 | 23.8 | 18.8 | 23.8 | 23.8 | 23.8 | 23.8 |
| Inorganic Filler | 65.5 | 65.5 | 65.5 | 65.5 | 65.5 | 65.5 | 65.5 |
| Antioxidant | 0.7 | 0.7 | 0.7 | 0.7 | 0.7 | 0.7 | 0.7 |
| Strain at Break (%) | 110 | 130 | 80 | 85 | 75 | 55 | 30 |

[Evaluation of Other Properties of Flame Retardant Resin Composition]

For each flame retardant resin composition obtained in Examples 4 to 8, the following physical properties other than the above strain at break were evaluated. Each evaluation result is shown in Table 3.

<Tensile Properties (Yield Stress, Stress at Break)>

Each flame retardant resin composition obtained in Examples 4 to 8 was heat molded under the conditions of a heating temperature of 180° C. and a heating time of 10 minutes to prepare a flame retardant resin molded product. The obtained flame retardant resin molded product was punched into a dumbbell-shaped No. 3 with a thickness of 1 mm, a width of 5 mm, and a gauge length of 20 mm; and using the obtained specimen, a yield stress and a stress at break were measured at the tensile speed of 200 mm/min with reference to a method described in JIS K6251. The results are shown in Table 3. In Table 3, it is shown that the larger the yield stress and the stress at break are, the better the tensile properties are.

ignition) with reference to a method described in JIS K7201-2. The results are shown in Table 3. In any Example, shown was the limiting oxygen index of the extent that there was no practical problem in the flame retardancy. In Table 3, further, it is shown that the larger the limiting oxygen index value is, the better the flame retardancy is.

<Density>

For each flame retardant resin composition obtained in Examples 4 to 8, a density was measured at a temperature of 23° C. in accordance with Method A of JIS K7112 (Immersion method). The results are shown in Table 3.

TABLE 3

|  |  | Example 4 | Example 5 | Example 6 | Example 7 | Example 8 |
|---|---|---|---|---|---|---|
| Yield Stress | MPa | 9.8 | 10.0 | 11.4 | 9.6 | 10.6 |
| Stress at Break | MPa | 8.6 | 8.9 | 9.4 | 8.1 | 9.3 |
| MFR (2.16 kg) | g/10 min | 0.17 | 0.49 | 0.81 | 0.32 | 0.35 |
| MFR (21.6 kg) | g/10 min | 45.4 | 131.1 | 262.4 | 77.6 | 110.3 |
| Limiting Oxygen Index | — | 34 | 34 | 33 | 34 | 34 |
| Density | g/cm$^3$ | 1.51 | 1.52 | 1.54 | 1.53 | 1.52 |

The invention claimed is:

1. A flame retardant resin composition consisting of:
   a hydrogenated petroleum resin, being a hydrogenated product of a polymer of an alicyclic compound having a five-membered ring and an aromatic hydrocarbon compound;
   a polyolefin;
   an inorganic filler; and at least one additive selected from the group consisting of an antioxidant, a lubricant, a processing stabilizer, a coloring agent, a foaming agent, and a reinforcing agent; wherein a content of the hydrogenated petroleum resin is 1% by mass or more and 25% by mass or less, based on the total amount of flame retardant resin composition, a content of the polyolefin is 5% by mass or more and 35% by mass or less, based on the total amount of the flame retardant resin composition, a content of the additive is 0% by mass or more and 5% by mass or less, based on the total amount of the flame retardant resin composition, a ratio of a content C1 of the aromatic hydrocarbon compound to a content C2 of the alicyclic compound, C1/C2 (mass ratio), is 0.25 or more and 1.38 or less, and the polyolefin is at least one selected from the group consisting of an ethylene/vinyl acetate copolymer and an ethylene/ethyl acrylate copolymer.

2. The flame retardant resin composition according to claim 1, wherein the alicyclic compound is a DCPD compound having a dicyclopentadiene skeleton.

3. The flame retardant resin composition according to claim 1, wherein the aromatic hydrocarbon compound is at least one selected from the group consisting of an indene-based compound having an indene skeleton and a styrene-based compound having a styrene skeleton.

4. A method for manufacturing a flame retardant resin composition according to claim 1, comprising:

bringing a hydrogenated petroleum resin, being a hydrogenated product of a polymer of an alicyclic compound having a five-membered ring and an aromatic hydrocarbon compound, into contact with a polyolefin and an inorganic filler.

* * * * *